(12) United States Patent  
Rajaraman (10) Patent No.: US 7,994,662 B2  
(45) Date of Patent: Aug. 9, 2011

(54) THERMAL BLOCK AND THERMAL RAIL

(75) Inventor: Devarajan Rajaraman, Melville, NY (US)

(73) Assignee: Anorad Corporation, Shirley, NY (US)

( * ) Notice: Subject to any disclaimer, the term of this patent is extended or adjusted under 35 U.S.C. 154(b) by 224 days.

(21) Appl. No.: 12/489,787

(22) Filed: Jun. 23, 2009

(65) Prior Publication Data

US 2010/0319896 A1 Dec. 23, 2010

(51) Int. Cl.
*H02K 41/02* (2006.01)

(52) U.S. Cl. .................................................. 310/12.29

(58) Field of Classification Search ............... 310/12.29, 310/12.31, 12.33, 64; *H02K 41/02, 41/03, H02K 41/00*
See application file for complete search history.

(56) References Cited

U.S. PATENT DOCUMENTS

2007/0001520 A1* 1/2007 Yamazaki et al. ............... 310/12
2007/0176495 A1* 8/2007 Huang et al. ..................... 310/12

FOREIGN PATENT DOCUMENTS

JP 2004-289911 * 10/2004
JP 2008-67492 * 3/2008

* cited by examiner

*Primary Examiner* — Nguyen N Hanh
(74) *Attorney, Agent, or Firm* — Turocy & Watson LLP; R. Scott Speroff; John M. Miller (57) ABSTRACT

The innovation relates to systems and methodologies for facilitating and/or enhancing heat transfer in a stage machine employed in an industrial or manufacturing environment. A thermal block and thermal rail combination and/or a thermal block and bearing rail combination draw accumulated heat away from a source of heat generated within the stage machine, and such combinations conduct the heat to a base of the stage machine. Each type of combination is conductively coupled such that the conductive coupling facilitates the translation or movement of the stage while maintaining contact to facilitate the conduction through the thermal block and thermal rail of the stage machine. The removal of the heat from the source of the heat or the accumulation of the heat within the stage machine system prevents distortion of the machine or products being manufactured or measured by the machine from the heat.

20 Claims, 10 Drawing Sheets

THERMAL BLOCK AND THERMAL RAIL

TECHNICAL FIELD

The claimed subject matter relates generally to heat transfer, and more particularly to systems and methodologies for removing heat generated by a motor of a stage machine through a thermal block and a thermal rail.

BACKGROUND

Stage machines are used in various types of industrial, manufacturing, or logistical positioning and moving systems, including machining, metrology, and gantry type systems. Stage machines include a moving assembly, usually called a forcer or stage, which moves relative to a stationary base along a path responsive to a force generated by a motor. Linear motors are commonly employed in stage machines, although it is contemplated that other, disparate types of motors can be used in stage machines. A linear motor mounted to the machine can generate an electromagnetic force by application of current through one or more associated windings (coil) of the motor. There are various configurations of linear motors, including flat motors, U-channel motors, and tubular shaped motors. Different types of linear motors are also available, including brush, alternating current (AC) brushless, stepper, and induction motors. The windings, or motor coil, can be mounted directly on the stage; in the stage; or on the base depending on the type of motor and/or configuration of the stage machine. For example, in a permanent magnet linear motor, the motor coil can be mounted within a stage, wherein the stage is movable relative to a path oriented along the stationary base. The stationary base can include an array of permanent magnets configured to interact with the motor coil in the stage when energized with an excitation current to create the electromagnetic force capable of moving or forcing the stage.

Operation of the linear motor generates thermal energy in the form of heat that transfers to the stage upon which the motor coil is directly mounted. As certain applications require increased throughput, linear motors are subject to higher duty cycles and generate more heat, in which the heat consequently transfers from the motor coil to the stage of the machine. In an ambient environment, various heat transfer techniques can be employed to draw heat from the motor coil and stage of the linear machine. An example of the various techniques includes tempering the amount of heat generated from the linear motor by increasing the size of the motor to accommodate a higher duty cycle. According to another example, cooling fans, heat exchange systems, and/or liquid cooling systems can draw heat away from the machine. Similarly, natural heat transfer can take place through convection and radiation in an ambient environment. However, some environments, such as a vacuum chambers and/or clean rooms used in semiconductor wafer metrology, limit the introduction of these various techniques and suffer from the inability to draw heat off of the motor windings and stage of the machine before the heat impacts components or products of the machine or a process implementing the machine.

Some environments operate as clean environments and prevent introduction of foreign materials or systems such as a liquid cooling system. Other environments, such as those operating in a vacuum, do not have the requisite airflow to accommodate cooling fans or enable convective heat transfer. Still other environments operate within limited space and do not allow for space occupying cooling systems or increases in size of any aspect of the system, including an increase in size of the motor as a way to reduce the amount of heat generated through operation of the motor. Any of the aforementioned environments can be mutually exclusive of each other or co-exist in any combination. Regardless, each environment described has limitations that affect heat transfer of positioning and moving systems that involve different forms of heat generating motors.

For example, in a vacuum chamber used for semiconductor wafer metrology, increased throughput of a linear motor on a stacked positioning stage leads to higher duty cycles and more heat output by the linear motor. The heat has limited dissipation paths, as convection does not exist in a vacuum and there are often limitations to foreign materials that can be introduced into the precision metrology environment. Such precision environments can also be clean rooms that limit or prohibit introduction of substances such as fluids including gases, liquids, or solvents that are not already present in the system, or foreign devices or systems such as cooling fans or heat exchange devices. Conventionally, rails and bearing blocks that connect or couple the positioning stage to the stationary base are made out of high performance materials for strength, rigidity, and durability, and not for thermal conductivity. An example is that the bearing rails and bearing blocks of a positioning stage often are made out of steel which does not does not facilitate or enhance conductive heat dissipation through the bearing railing and bearing blocks. Radiative heat exchange can occur in any environment, but increases in duty cycles of the motor as a result of the increased throughput for the positioning stage generates heat in a manner that outpaces the radiative and/or conductive properties of typical linear stage machines operating in such limiting environments. As a result, the heat generated by the linear motor typically has limited means to dissipate from the stage and subsequently is transferred to the precision equipment used in the wafer metrology thus causing distortion of the precision equipment. In accordance with the wafer metrology example, the heat from the stage can transfer to a chuck holding a wafer causing the chuck to distort, or the heat can also transfer to an interferometer mirror placed close to the chuck causing the mirror to translate and distort. Any such distortion in a precision environment can prevent effective metrology. To this end, future requirements for higher throughput in linear motors used in positioning and moving systems, including those operating in environments with strict limitations, face heat generation and distortion to the products and machining employed in these applications that outpace the ability to dissipate heat.

SUMMARY

The following presents a simplified summary in order to provide a basic understanding of some aspects of the disclosed examples of the present innovation. This summary is not an extensive overview and is intended to neither identify key or critical elements nor delineate the scope of such examples. Its purpose is to present some concepts of the described examples in a simplified form as a prelude to the more detailed description that is presented later.

Systems and methodologies are provided for facilitating transfer of heat in a stage machine employed in an industrial environment. A thermal block and thermal rail combination draws heat away from accumulated heat on a stage of the stage machine from the utilization of a motor coil affixed to the stage. The thermal block and thermal rail comprise materials that facilitate or enhance heat transfer, and thus comprise materials that have high thermal conductivity at least with respect to other aspects of the stage machine.

Additionally or alternatively, systems and methodologies are provided for facilitating the transfer of heat from a stage machine in an industrial environment through the load bearing structure that couples or connects the stage of the stage machine to a stationary base of the stage machine. Thermal blocks can be mounted in a manner to facilitate or enhance drawing heat away from a source of the heat and/or accumulated heat on the stage to the base of the stage machine. The thermal blocks in this example are conductively coupled to a bearing rail within the load bearing structure.

Moreover, systems and methodologies are provided to facilitate the transfer of heat away from heat generated in a stage machine through an independent thermal block and thermal rail combination in addition to a load bearing structure (load bearing blocks and load bearing rails) that includes one or more thermal blocks. The thermal blocks are mounted in such a manner to the stage machine so as to draw or transfer heat away from the source of the heat by coupling thermal blocks to corresponding thermal rails and/or by coupling thermal blocks to corresponding load bearing rails within the load bearing structure.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings, and the disclosed examples are intended to include all such aspects and their equivalents.

DETAILED DESCRIPTION

The subject matter is now described with reference to the drawings, wherein like reference numerals are used to refer to like elements throughout. In the following description, for purposes of explanation, numerous specific details are set forth in order to provide a thorough understanding of the subject matter. It may be evident, however, that subject matter examples may be practiced without these specific details.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Figure 1:
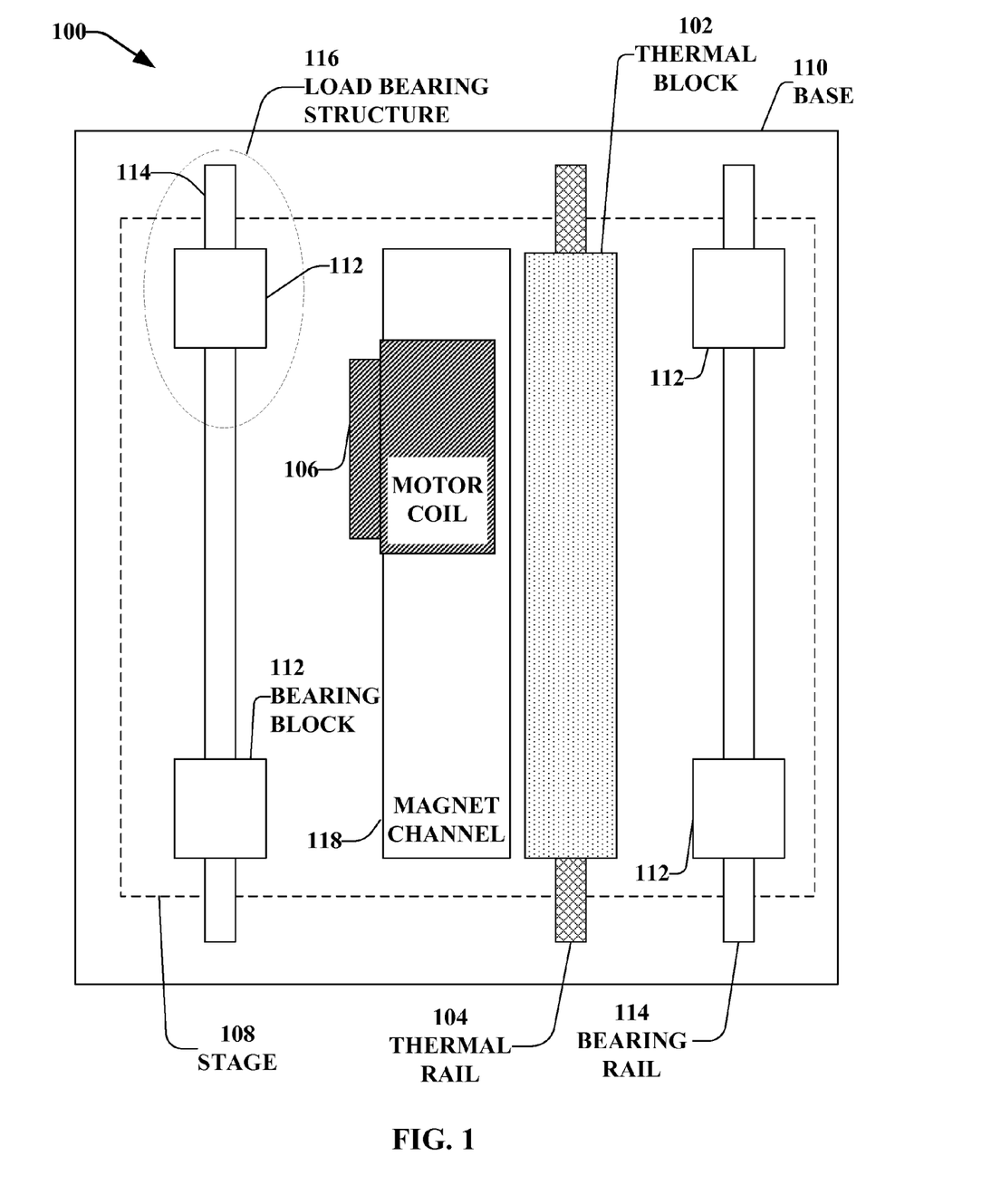
FIG. 1 is an elevated perspective view of an example system for removing heat from a single stage direct drive linear stage machine with an independent thermal rail in accordance with various aspects set forth herein.

Referring initially to FIG. 1, an example system 100 for removing heat from a stage machine through an independent thermal block 102 and thermal rail 104 is shown. The system 100 generally illustrates an example apparatus that includes a single stage direct drive linear stage machine with an independent thermal rail. More particularly, the system 100 includes a motor coil 106 (the motor coil 106 is also referred to herein as the windings of a motor), rigidly mounted to a stage 108. The stage 108 is mounted to a base 110 of the stage machine that is stationary through one or more load bearing structures 116, wherein each load bearing structure 116 includes a bearing block 112 coupled to a bearing rail 114. The stage 108 can move or translate relative to the stationary base 110 through the interaction of the bearing block 112 with the bearing rail 114. The system 100 also includes thermal block 102 conductively coupled to thermal rail 104. The thermal block 102 and thermal rail 104 are arranged such that heat generated from the motor coil 106 can dissipate from the stage 108 to the base 110.

The system 100 includes a linear motor that generates an electromagnetic force through motor coil 106 rigidly affixed or mounted to the moveable or translatable stage 108 of the stage machine in system 100. An electric current passed through the motor coil 106 interacts with a magnet channel 118 located in the base 110 thus creating electromagnetic force along the length of the motor coil 106 and associated magnet channel 118. The force applied to the motor coil 106 is likewise applied to the stage 108 as a consequence of the rigid mounting of the motor coil 106 to the stage 108. Therefore, the stage 108 can move or translate in response to the force generated by the motor coil 106 because of the rigid affixation of the motor coil 106 to the stage 108 and the stationary nature of the base 110 housing the magnet channel 118 (e.g. the force generated by the motor coil 106 interacting with the magnet channel 118 can force or drive movement of the stage 108). The motor coil 106 of system 100 is not limited to a linear motor. One of ordinary skill in the art would appreciate that any suitable form of motor, including but not limited to a linear direct drive motor, a rotary direct drive motor, a ball-screw drive motor, a belt drive motor, and/or a rack-and-pinion motor can be implemented with example aspects of the present specification.

The bearing block 112 is operatively coupled to the bearing rail 114 forming, at least in part, the load bearing structure 116. The coupling is operative so as to allow the bearing block 112 to translate or travel along the axis of the bearing rail 114 while connecting or joining the bearing block 112 to the bearing rail 114. The translation or travel of the operative coupling can be facilitated by any suitable form of sliding, rolling-element, jewel, fluid, magnetic, flexure bearings, and/or lubrication. The bearing block 112 in accordance with FIG. 1 is rigidly mounted to the stage 108. In addition, the bearing rail 114 is rigidly mounted to the base 110. Consequently, the operative coupling of the bearing block 112 to the bearing rail 114 connects or joins the stage 108 to the base 110 of the system such that the operative coupling carries or bears the load of the stage 108 and further allows for translation or movement of stage 108. In particular, the operative coupling allows the stage 108 to translate or travel in accordance with the translation or travel of the bearing block 112 that the stage 108 is rigidly affixed thereto. Therefore, the motor coil 106 drives or forces the stage 108 along the axis of the bearing rail 114 causing the stage 108 to be a moveable stage 108. The operatively coupled bearing block 112 and bearing rail 114 attach the stage 108 to the base 110 by having the bearing block 112 rigidly mounted or affixed to either the stage 108 or the base 110, and the corresponding bearing rail 114 in the operative coupling of the load bearing structure 116 is rigidly mounted or affixed to the other of the stage 108 or base 110 to which the bearing block 112 is mounted.

Thermal energy or heat is generated as a result of the current applied to motor coil 106. Higher duty cycles (e.g. time of active operation) correspond with an increased amount of heat generated by the motor coil 106. As a result of the motor coil 106 being mounted to the stage 108, heat generated by the motor coil 106 transfers to the stage 108. Heat transfer or heat exchange in general occurs across heat gradients or between objects with a temperature difference. Furthermore, heat will transfer or dissipate through a material with a higher thermal conductivity or lower thermal resistance faster than a material with a measure of lower thermal conductivity or higher thermal resistance. Therefore, an increase in temperature of the stage 108 from thermal energy that builds up or accumulates in the system 100 from the use of motor coil 106 on stage 108 will seek to dissipate across an object of a lower temperature with high thermal conductivity (low thermal resistance).

Thermal block 102 and thermal rail 104 that are conductively coupled are mounted proximate to a location of the heat in system 100 in a manner such that heat is transferred from the stage 108 to the base 110 through the conductively coupled thermal block 102 and thermal rail 104. The base 110 itself or the ground or flooring that the base 110 is stationed on acts as a heat sink for the system 100, including the heat generated in system 100 and conducted through the thermal block 102 paired with thermal rail 104. Each of thermal block 102 and thermal rail 104 comprise a material with high thermal conductivity or low thermal resistance to create a path to dissipate heat and/or facilitate conducting heat away from the source of the heat. FIG. 1 illustrates that the conductive coupling or the conductive pairing of the thermal block 102 and thermal rail 104 is mounted near the motor coil 106, because placement of the thermal block 102 and thermal rail 104 coupling is proximate to a source of the heat in system 100, which in this example is the motor coil 106. However, it is to be appreciated that the thermal block 102 and corresponding thermal rail 104 quantity and placement is not limited to placement near a motor coil 106 of the system 100. Any number of thermal blocks 102 and/or thermal rails 104 can be positioned near any source of heat in the system 100 or can be positioned in accordance with any number of stages or functional design of the type of stage machine. FIG. 1 is an example in accordance with an aspect of the present specification that illustrates one such positioning, in which the conductively coupled thermal block 102 and thermal rail 104 are mounted adjacent to the motor coil 106 of the system 100 relative to the load bearing structure 116, e.g. the bearing block 112 coupled to the bearing rail 114.

Accordingly, the length of the each the thermal rail 104 and thermal block 102 need not span the length of the stage 108 as illustrated in FIG. 1 but also can be implemented in any manner so as to maximize the dissipation of the conduction of heat from any heat buildup in the system 100. To this end, FIG. 1 illustrates that the conductively coupled thermal block 102 and thermal rail 104 are shown with an example length positioned nearer to the source of the heat, e.g. motor coil 106, than the bearing block 112 or bearing rail 114.

The thermal block 102 and thermal rail 104 each comprise a material with high thermal conductivity. Such materials that compose a thermal block 102 and/or a thermal rail 104 with high thermal conductivity are metals or composite materials, and include but are not limited to: aluminum, copper, beryllium-copper, gold, silver, titanium, zinc, magnesium, carbon steel, copper-zinc, or any alloys thereof. Moreover, the thermal block 102 and thermal rail 104 each comprise a material with higher thermal conductivity or lower thermal resistance than the material typically comprising the bearing block 112 and bearing rail 114, wherein the bearing block 112 and bearing rail 114 typically comprise steel or any alloy thereof.

It is to be appreciated that FIG. 1 illustrates a single stage direct drive linear stage machine, but the present innovation is not limited to a single stage direct drive machine. System 100 can be implemented with any number of stages along multiple axes such as in a stacked multi-axes stage machine, a tilt stage machine, a gantry or gantry-type machine, a rotational axis machine, or a Cartesian robot. In addition to an ambient environment, system 100 can be employed in an environment limited by physical space, or limited with respect to the introduction of foreign materials machines or substances, such as a clean room that restricts the introduction foreign substances or machines and their implements. Moreover, system 100 can be employed in a vacuum environment or vacuum chamber. A vacuum environment or vacuum chamber operates in a limited pressure environment which restricts the air and airflow therein. System 100 can further be employed in an environment that is confined by a combination of clean room, vacuum, physical space, or a combination thereof.

Heat that pools or accumulates in the stage 108 has limited ability to dissipate or escape and can damage the stage product associated with the stage in a confined environment. The pooling of heat can be further exacerbated depending upon the environment in which the system 100 operates. For example, a stage machine used in semiconductor wafer metrology operates in a clean room and/or vacuum environment. A vacuum environment prevents the dissipation of heat through convection because air and airflow are removed from the environment, thus removing necessary components of convection. Heat will accumulate on stage 108 if the radiation cannot disperse or dissipate at a pace at or near the pace of the heat generated by the duty cycle required of the motor coil 106 with the system 100. The heat accumulated or pooled on the stage 108 can impact the stage by warping the stage, or in the metrology example, heat can transfer to a semiconductor wafer chuck implemented in the system causing the chuck to distort or the metrology optics to translate and distort.

Figure 2:
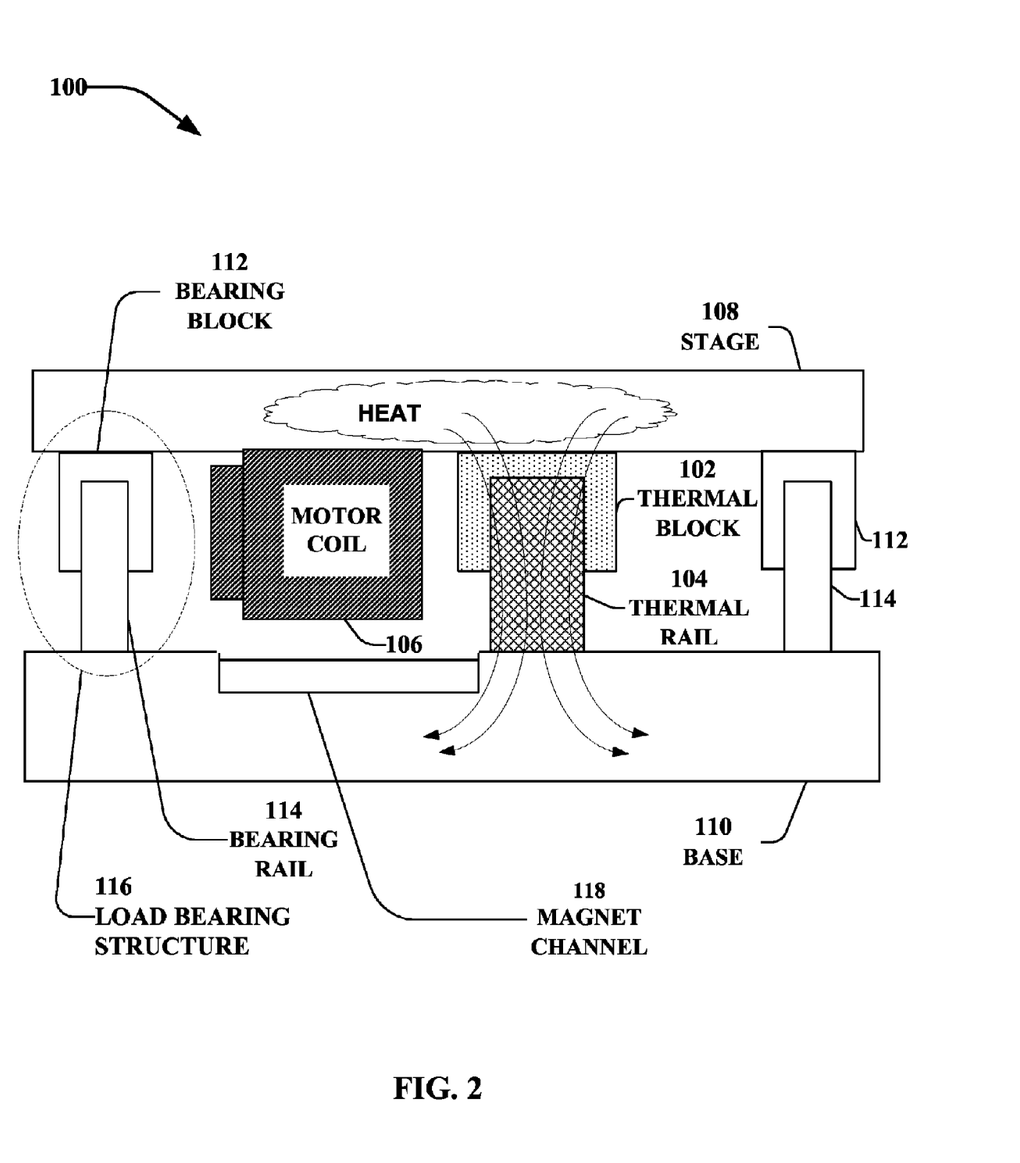
FIG. 2 is a cross-section end perspective view of the example system for removing heat from a single stage direct drive linear stage machine of FIG. 1.

FIG. 2 shows system 100 from a different perspective than FIG. 1. FIG. 2 is a cross-section end perspective of system 100 and shows an exemplary path of the heat accumulated on the stage dissipating to the base 110 through the conductively coupled thermal block 102 and thermal rail 104. Further, FIG. 2 illustrates the motor coil 106 affixed to the stage 108 in proximity to the magnet channel 118 of the base 110. Moreover, FIG. 2 illustrates that the thermal block 102 rigidly mounted to the stage 108, and the thermal rail 104 conductively coupled to the thermal block 102 is rigidly mounted to the base 110. It must be appreciated that FIGS. 1 and 2 are merely examples for brevity and clarity of explanation. Any number of stages and/or corresponding load bearing structures 116 featuring bearing blocks 112 and bearing rails 114 can be employed in the present system 100, and any number of thermal blocks 102 and thermal rails 104 can be employed to facilitate drawing heat away from the system 100. Moreover, any number of bearing blocks 112 can be associated or coupled with bearing rail 114, and similarly, any number of thermal blocks 102 can be associated or conductively coupled with a particular thermal rail 104.

Figure 3:
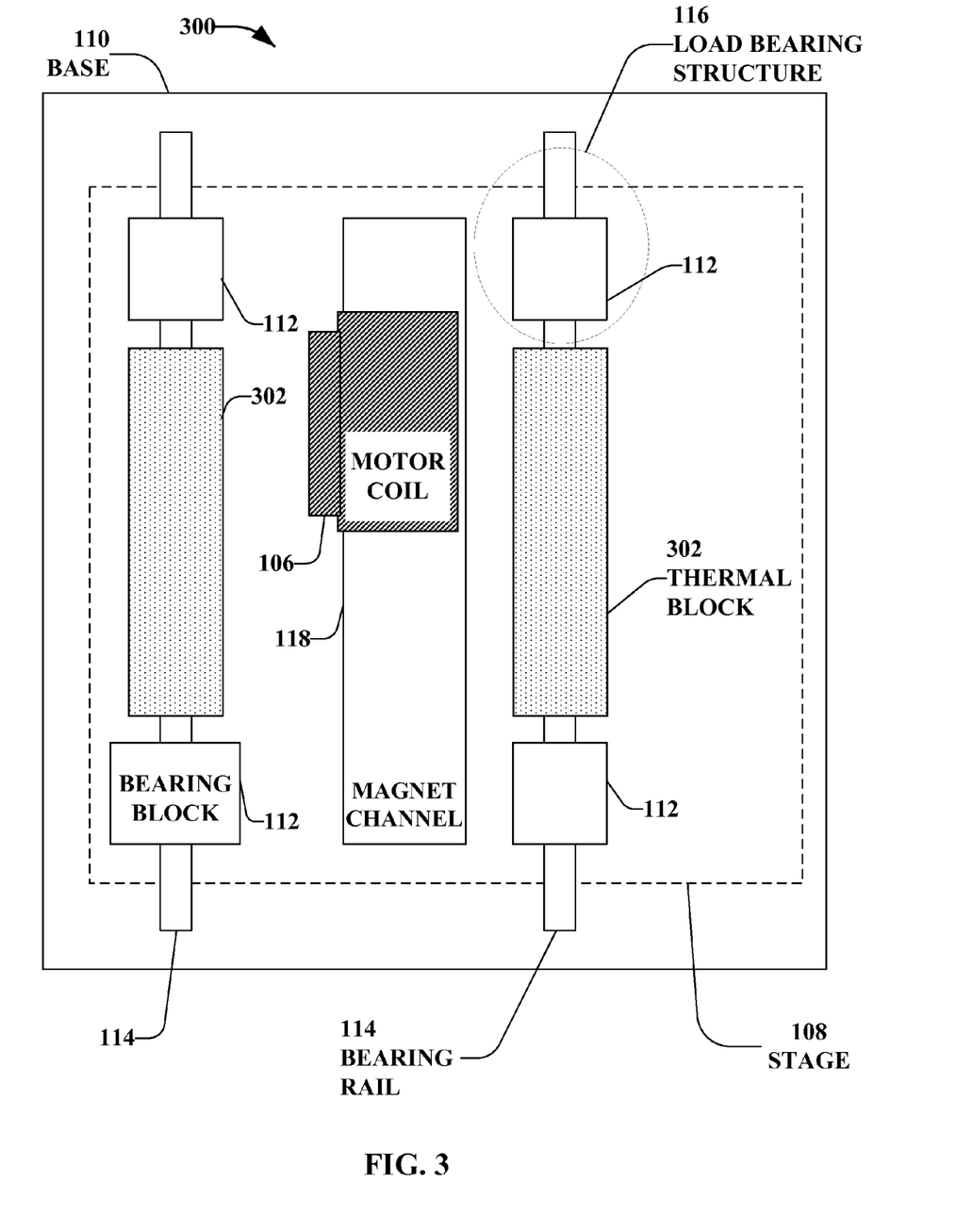
FIG. 3 is an elevated perspective view of an example system for removing heat from a single stage direct drive linear stage machine with a thermal block on each a load bearing rail and an independent thermal rail in accordance with various aspects set forth herein.

Turning now to FIG. 3, an example system 300 for removing heat from a stage machine is shown in accordance with an aspect of the present specification from an elevated perspective. FIG. 3 generally relates to an example system 300 that facilitates and/or enhances transferring heat through the use of a thermal block 302 conductively coupled to the bearing rail 114. Similar to system 100 of FIG. 1, system 300 illustrates a linear motor driven single stage machine. System 300 includes the motor coil 106 rigidly affixed or rigidly mounted to the stage 108 of the system 300 and the corresponding magnet channel 118 of the linear motor. System 300 has one or more load bearing structures 116 that includes one or more bearing block 112 operatively coupled to corresponding bearing rail 114. The bearing block 112 can be rigidly mounted or fastened to the stage 108 wherein the bearing rail 114 operatively coupled to the bearing block 112 is rigidly mounted or fastened to base 110. Conversely, the bearing block 112 can be rigidly mounted to the base 110, and the corresponding bearing rail 114 is rigidly mounted to the stage 108. The operative coupling of the bearing block 112 with bearing rail 114 attaches the stage 108 to the base 110, and through the travel or translation of the bearing block 112 along the axis of the bearing rail 114, the stage 108 can travel or translate accordingly relative to the base 110. The operative coupling of the bearing block 112 with the bearing rail 114 further carries the load of the stage 108.

System 300 also includes at least one thermal block 302 that can be conductively coupled to the bearing rail 114. The thermal block 302 provides a path to dissipate heat from system 300 by facilitating and/or enhancing the conduction of heat between a heat source to the base 110 and/or ground acting as a heat sink for the system. The thermal block 302 can be mounted to the stage 108 of the system 300 or the base 110 of the system so long as the thermal block 302 is conductively coupled to the bearing rail 114 that operates, at least in part, to carrying the load of the stage 108. The conductive coupling of the thermal block 302 to bearing rail 114 also allows for the translation or movement along the axis of the bearing rail 114 while forming a conductive contact between the surfaces of the thermal block 302 and bearing rail 114.

FIG. 3 illustrates that thermal block 302 is conductively coupled to bearing rail 114 in an arrangement between two bearing blocks 112 in a coupling along the same bearing rail 114. Thus, as is illustrated, more than one bearing block 112 can be implemented per bearing rail 114. Likewise, more than one thermal block 302 can be conductively coupled along the bearing rail 114 in any suitable arrangement so as to facilitate and/or enhance conduction of heat away from a heat source in the system 300. For example, the arrangement along the bearing rail 114 can include alternating between thermal blocks 302 and bearing blocks 112; thermal block 302 that is longer in length than the bearing block 112 (as is shown in FIG. 3); and/or one or more thermal blocks 302 positioned such that the one or more thermal blocks 302 traverses the length of the accumulated heat in the system and/or the length of any heat source in the system 300 (e.g. the length of the motor coil 106). The bearing rail 114, in addition to the accompanying thermal block 302 conductively coupled thereto, can be positioned proximate to the source of heat, e.g. motor coil 106, or accumulation of heat as is shown in FIG. 3.

Similar to system 100, system 300 of FIG. 3 illustrates a single stage direct drive linear stage machine for brevity and clarification of explanation, although system 300 is not limited to the single stage machine with the direct drive linear motor. System 300 can be implemented with any number of stages configured with any number of axes, such as in a stacked multi-axes stage machine, a tilt stage machine, a gantry or gantry-type machine, a rotational axis machine, or a Cartesian robot. System 300 can be implemented with any suitable form of motor, including but not limited to a linear direct drive motor, a rotary direct drive motor, a ball-screw drive motor, a belt drive motor, and/or a rack-and-pinion motor with the present innovation. The thermal block 302 comprises a material with high thermal conductivity properties wherein such materials are metals or composite materials that include but are not limited to aluminum, copper, beryllium-copper, gold, silver, titanium, zinc, magnesium, carbon steel, copper-zinc, or any alloys thereof. The bearing rail 114 comprises a material suitable for high performance use of the stage machine and suitable for bearing or carrying the load of the stage 108 such as any form of steel (e.g. galvanized, stainless, carbon, etc.), and can further include a metal or a composite material that has a high thermal conductivity and low thermal resistance, such as the aforementioned materials comprising the thermal block 302. Moreover, as is discussed for system 100, in addition to operation in an ambient manufacturing or industrial environment, system 300 can be implemented in a facility limited by square or cubic feet of space, a vacuum environment, a clean environment, or any combination thereof.

Figure 4:
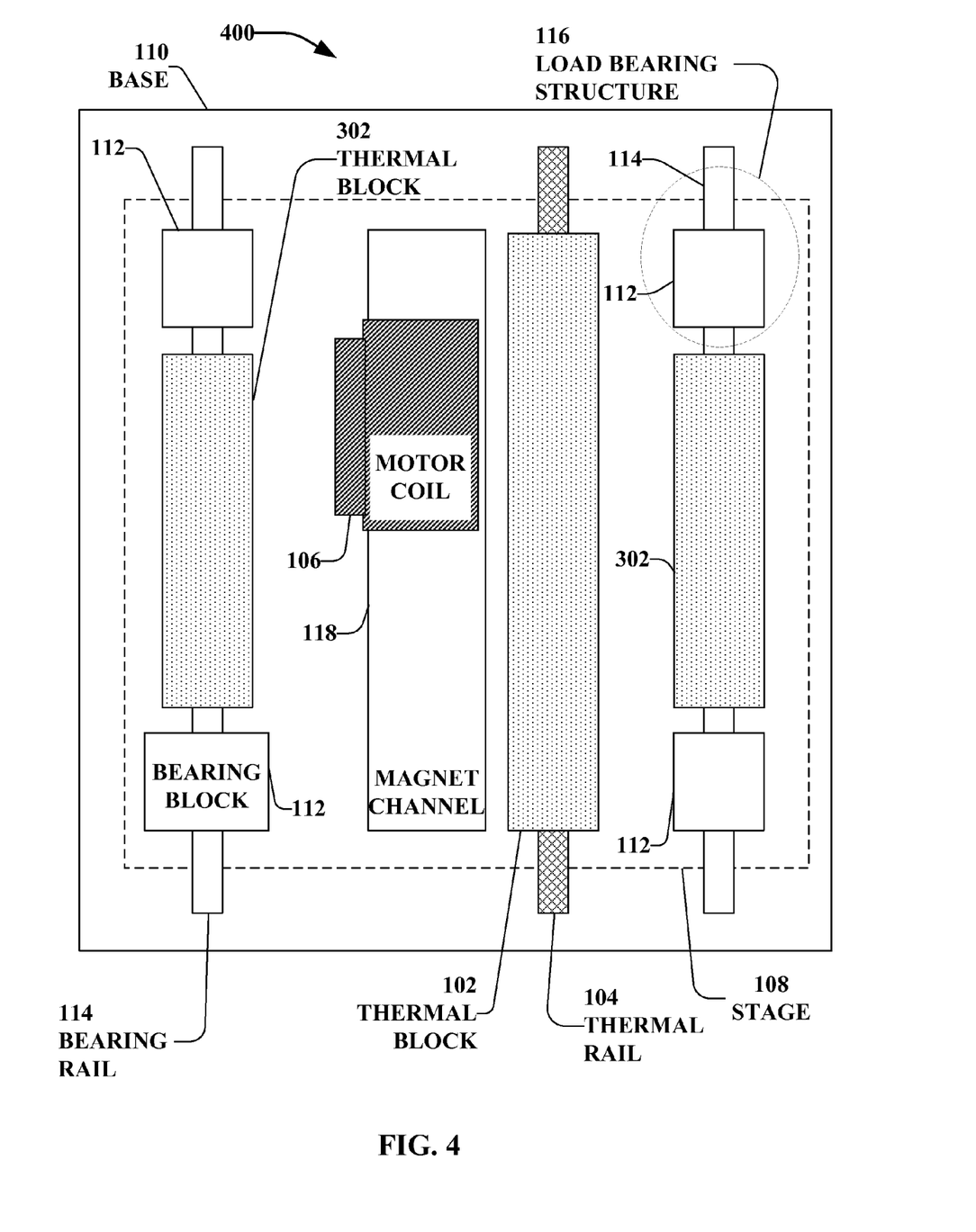
FIG. 4 is an elevated perspective view of an example system for removing heat from a single stage direct drive linear stage machine with thermal block on a load bearing rail in accordance with various aspects set forth herein.

Moving on to FIG. 4, an example system 400 for removing heat from a stage machine generated by the motor coil 106 that employs the independent thermal block 102 and thermal rail 104 coupling in addition to the thermal block 302 coupled to bearing rail 114. In particular, system 400 shows a single stage direct drive linear stage machine. FIG. 4 includes stage 108 connected to the base 110 through one or more load bearing structures 116 formed by one or more series of load bearing blocks 112 coupled to load bearing rails 114 in a manner so as to allow the load bearing blocks 112 to slide or translate along a path defined by the length of the load bearing rail 114. For clarity and brevity of explanation, system 400 can be implemented with any number of stages or motors, including but not limited to a stacked multi-axes stage machine, a tilt stage machine, a gantry or gantry-type machine, a rotational axis machine, or a Cartesian robot driven by a linear direct drive motor, a direct drive rotary motor, a ball-screw drive motor, a belt drive motor, and/or a rack-and-pinion motor. System 400 can be implemented in a facility limited by square or cubic feet of space, a vacuum environment, a clean environment, or any combination thereof in addition to operation in an ambient environment.

Although FIG. 4 illustrates one independent thermal block 102 and thermal rail 104, any number of thermal blocks 102 and independent thermal rails 104 can be employed to dissipate heat from system 400. Moreover, more than one thermal block 102 can be operatively coupled to thermal rail 104 to dissipate heat in accordance with the present aspect of system 400. The thermal block 102 can be implemented as is illustrated in FIG. 4, which nearly spans the length of the stage 108, or one or more thermal blocks 102 can be conductively coupled to the thermal rail 104 so as to span the length of the heat accumulation on the stage 108. The conductive coupling of the independent thermal block 102 and thermal rail 104 allows for the translation or travel of the thermal block 102 along the path defined by the thermal rail 104 that the thermal block 102 is coupled thereto. The path defined by thermal rail 104 compliments the path defined by the load bearing rail 114 for stage 108. As discussed above, system 400 can be implemented on any number of stages or orientations of stage machines (e.g. multi-axes stage machine, a tilt stage machine, a gantry or gantry-type machine, a rotational axis machine, or a Cartesian robot) such that different stages have different orientations or allow for translation in a different direction that other stages in the machine. Accordingly, thermal block 102 and thermal rail 104 for each stage 108 is arranged in a manner allowing for translation of the thermal block 102 along the thermal rail 104 without hindering or impeding the translation of the load bearing block 112 (and consequently the thermal bearing block 302 of system 400) along the load bearing rail 114 that carries or bears the weight of the stage 108.

Similar to the various aspects previously described, the thermal blocks 102, 302, and thermal rail 104 each comprise a material with a high measure of thermal conductivity so as to facilitate the transfer of heat and draw heat away from the stage through conduction. The material comprising the thermal blocks 102, 302, and thermal rail 104 includes but is not limited to metals such as aluminum, copper, beryllium-copper, gold, silver, titanium, zinc, magnesium, carbon steel, copper-zinc, or any alloys thereof. The load bearing block 112 and load bearing rail 114 can be implemented with the same materials as the thermal block 102 and/or thermal rail 104, but conventionally are implemented comprising a material with high compressive and shear strengths, such as steel alloys, but not as high of thermal conductivity as the previous materials of thermal blocks 102, 302 and thermal rail 104.

Figure 5:
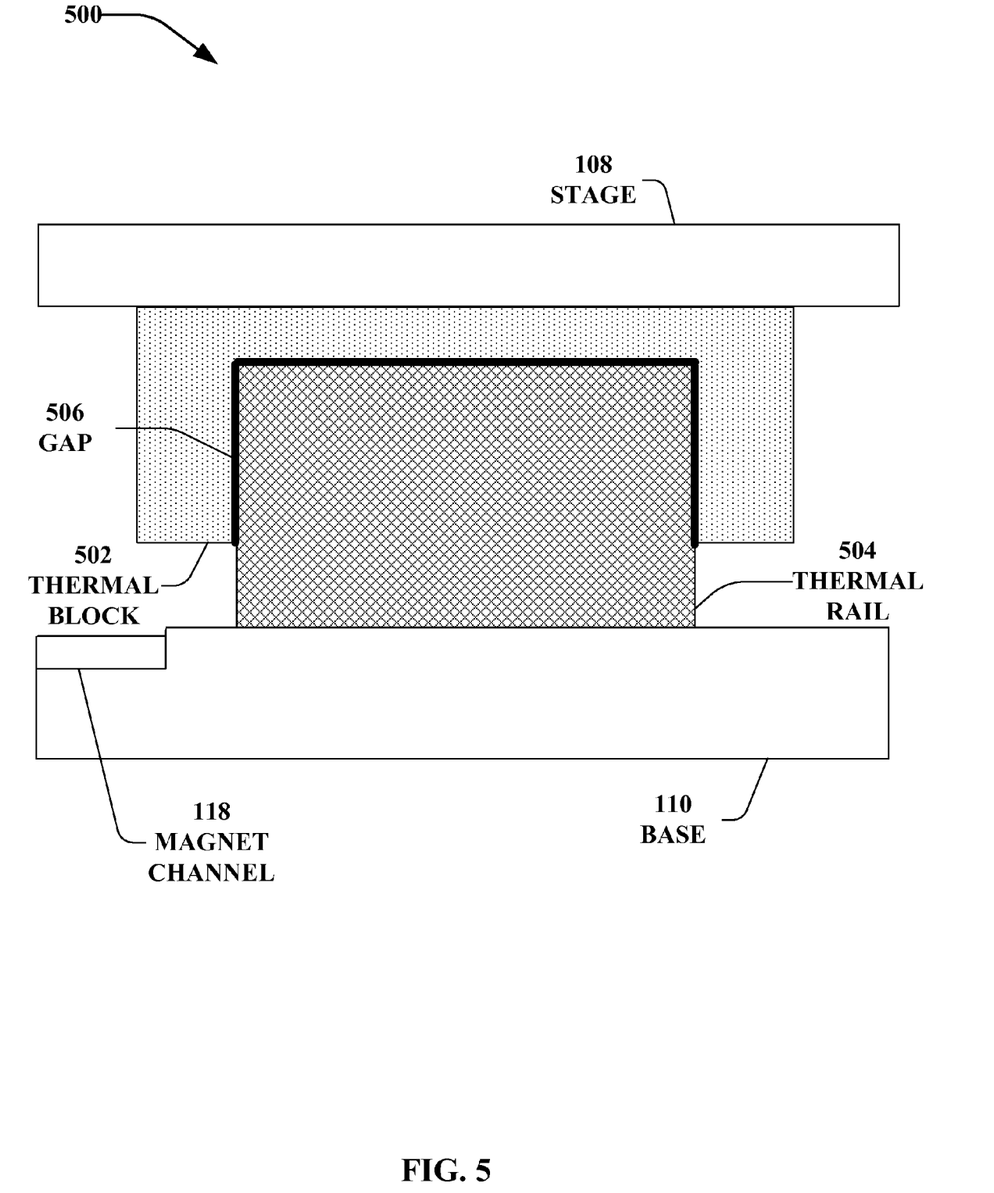
FIG. 5 is a cross-section end perspective view of an example thermal block and thermal rail in accordance with various aspects set forth herein.

FIG. 5 illustrates an enlarged cross-section end perspective view the thermal block 502 coupled to thermal rail 504 in system 500. Thermal block 502 as shown in FIG. 5 is an example orientation of thermal block 102 of FIG. 1. Similarly, thermal rail 504 is an example orientation of thermal rail 104 of FIG. 1. Particularly, FIG. 5 illustrates that the conductive coupling of thermal block 502 and thermal rail 504 that creates a path for heat to transfer or dissipate from the stage 108 to the base 110. Moving from top to bottom of FIG. 5, a surface of stage 108 is in contact with thermal block 502. This contact is in the form of the stage 108 being mounted, fastened, or affixed in some manner to the thermal block 502. A gap 506 exists between thermal block 502 and thermal rail 504, although horizontal and vertical surfaces of thermal block 502 encompass surfaces of thermal rail 504, thus creating a greater surface area for heat transfer between the thermal block 502 and thermal rail 504. Thermal rail 504 as shown in FIG. 5 is mounted to base 110. FIG. 5 illustrates that the magnet channel 118 utilized by the motor coil 106 (not shown in FIG. 5) is proximate to the thermal rail 504 and thermal block 502 coupling, in accordance with an aspect of the present innovation. The proximity of the magnet channel 118 indicates that a heat source (e.g. a motor coil) is nearby to the conductive coupling of the thermal block 502 and thermal rail 504. Therefore, heat that accumulates or is transferred to the stage from the heat source can dissipate or pass through the conductively coupled thermal block 502 and thermal rail 504 as shown in FIG. 5.

One form of heat transfer is conduction which is the transfer of heat through the direct contact of particles of matter wherein atoms interact with neighboring atoms and pass electrons (and hence thermal energy) from atom to atom. Conduction is greater in solids, where atoms are in constant contact. Liquids and gases in general have molecules are usually further apart, giving a lower chance of the direct contact of molecules colliding and passing on thermal energy. However, common to transferring heat through conduction is providing contact between surfaces of the objects transferring heat so as to allow the atoms to interact with neighboring atoms. This contact is achieved in gap 506 through any suitable form of thermally conductive lubricant creating a flexible or tensile contact, bond, or bridge between the surfaces of the thermal block 502 and thermal rail 504. Thus, a layer of thermally conductive lubricant filling gap 506 abuts both a surface of the thermal block 502 and a surface of the thermal rail 504 so as to facilitate heat conduction between the conductively coupled thermal block 502 and thermal rail 504.

The thermally conductive lubricant employed in the conductive coupling of thermal block 502 and thermal rail 504 filling gap 506 is any form of flexible or tensile lubricant such as an oil or grease that serves both to lubricate the travel or translation of the thermal block 502 along thermal rail 504 in addition to providing a contact to facilitate conduction between the thermal block 502 and thermal rail 504. The oil or grease lubricant fills gap 506 such that the oil or grease forms a contiguous path for heat to transfer in the space within the gap 506. In addition to an ambient manufacturing or industrial environment, system 500 can be employed in a confined or limited environment such as a clean room or a vacuum environment that is both limited in physical space and materials that can be introduced. In a confined environment, such as a clean room and/or vacuum chamber, foreign materials or substances cannot typically be introduced, including something such as a new lubricant to fill gap 506 of system 500. Therefore, a lubricant employed within load bearing structure 116 by bearing block 112 and bearing rail 114 that is already introduced and approved for use in the clean room and/or vacuum environment can be employed as the lubricant (e.g. thermally conductive oil or grease) employed to fill gap 506. If system 500 is not employed in a confined or limited environment such as a clean room and/or vacuum, but is employed in an ambient environment within a manufacturing or industrial process and/or system, any suitable lubricant with high thermal conductivity properties can be implemented to fill gap 506.

Moreover, although FIG. 5 illustrates an enlarged view of the conductive coupling of a thermal block 502 and thermal rail 504, it must be appreciated that any conductive coupling in the present specification can employ the same technique, including a thermal block 302 and bearing rail 114 of system 300. A gap between thermal block 302 and bearing rail 114 of system 300 can be filled with a layer of lubricant already employed by the bearing block 112 and bearing rail 114 coupling to form a thermally conductive bridge between a surface of the thermal block 302 and a surface of the bearing rail 114.

As is apparent in FIG. 5, depending on the viscous properties of the lubricant employed in gap 506, gravitational forces can cause the migration or seepage of the lubricant away the conductive coupling occurring within the gap 506 and down the side of the thermal rail 504 to the base 110. Although the nature of the properties of the lubricant may change based on the duty cycle of the operation of system 500 (e.g. the sliding or translation of the thermal block 502 along the thermal rail 504 can generate thermal energy and change the physical properties of the lubricant, such as viscosity), in general a less viscous lubricant (e.g. oil or grease) used as a thermally conductive bridge in the gap 506 is less likely to migrate based on gravitational forces than a more viscous lubricant.

Figure 6:
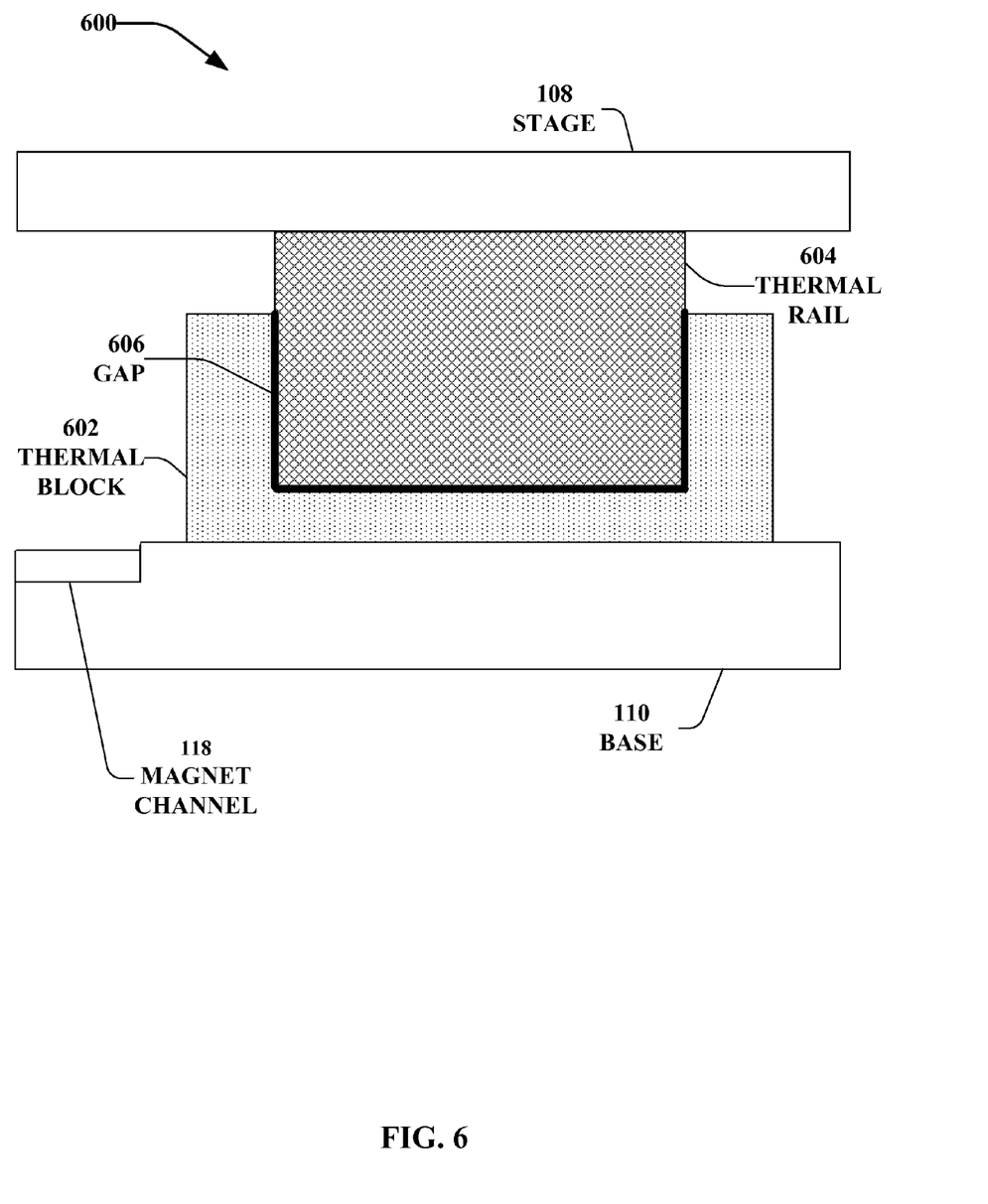
FIG. 6 is a cross-section end perspective view of an example inverted thermal block and thermal rail in accordance with various aspects set forth herein.

FIG. 6 illustrates an enlarged cross-sectional perspective view the thermal block 602 coupled to thermal rail 604 in system 600. Thermal block 602 and thermal rail 604 are thermal block 102 and thermal rail 104 of FIG. 1, respectively, arranged in an example orientation as shown in FIG. 6. In particular, FIG. 6 illustrates the conductive coupling of thermal block 602 and thermal rail 604 in the example orientation inverted relative to system 500. Thermal rail 604 is mounted or affixed to stage 108 and the corresponding thermal block 602 is mounted or affixed to the base 110 in a manner to form a "U"-shaped gap 606 relative to the base 110. This gap 606 is filled with a lubricant to form the conductive coupling of the thermal block 602 to the thermal rail 604. The lubricant filling gap 606 forms a conductive contact, bridge, or bond between the surfaces of the thermal block 602 and thermal rail 604. This inverted orientation closes any path from which a lubricant employed in gap 606 can migrate due to gravity or change in viscous properties acting on the lubricant. Thus, the orientation of system 600 facilitates the use of a lubricant having a higher viscosity than the viscosity of a lubricant employed in a conductive coupling in which lubricant migration can occur, such as in gap 506 of system 500. It must be appreciated that such orientation is illustrated in FIG. 6 for a conductive coupling of thermal block 602 with thermal rail 604, but such orientation can be applied to the conductive coupling of thermal block 302 with load bearing rail 114 as discussed in accordance with FIGS. 3 and 4.

Moreover, the illustrations of both system 500 and system 600 indicate that the orientation of the thermal block 602 conductively coupled to thermal rail 604 need not be limited to the specific orientations of FIGS. 5 and 6, respectively. The orientation of the conductively coupled thermal block 102 (e.g. thermal blocks 502 and 602) and thermal rail 104 (e.g. thermal rails 504 and 604) pairing can be in any orientation such as the same, inverted, or perpendicular relative to base 110, stage 108, bearing block 112, and/or bearing rail 114 with any shape, including the labyrinthing discussed infra with respect to FIG. 7.

Figure 7:
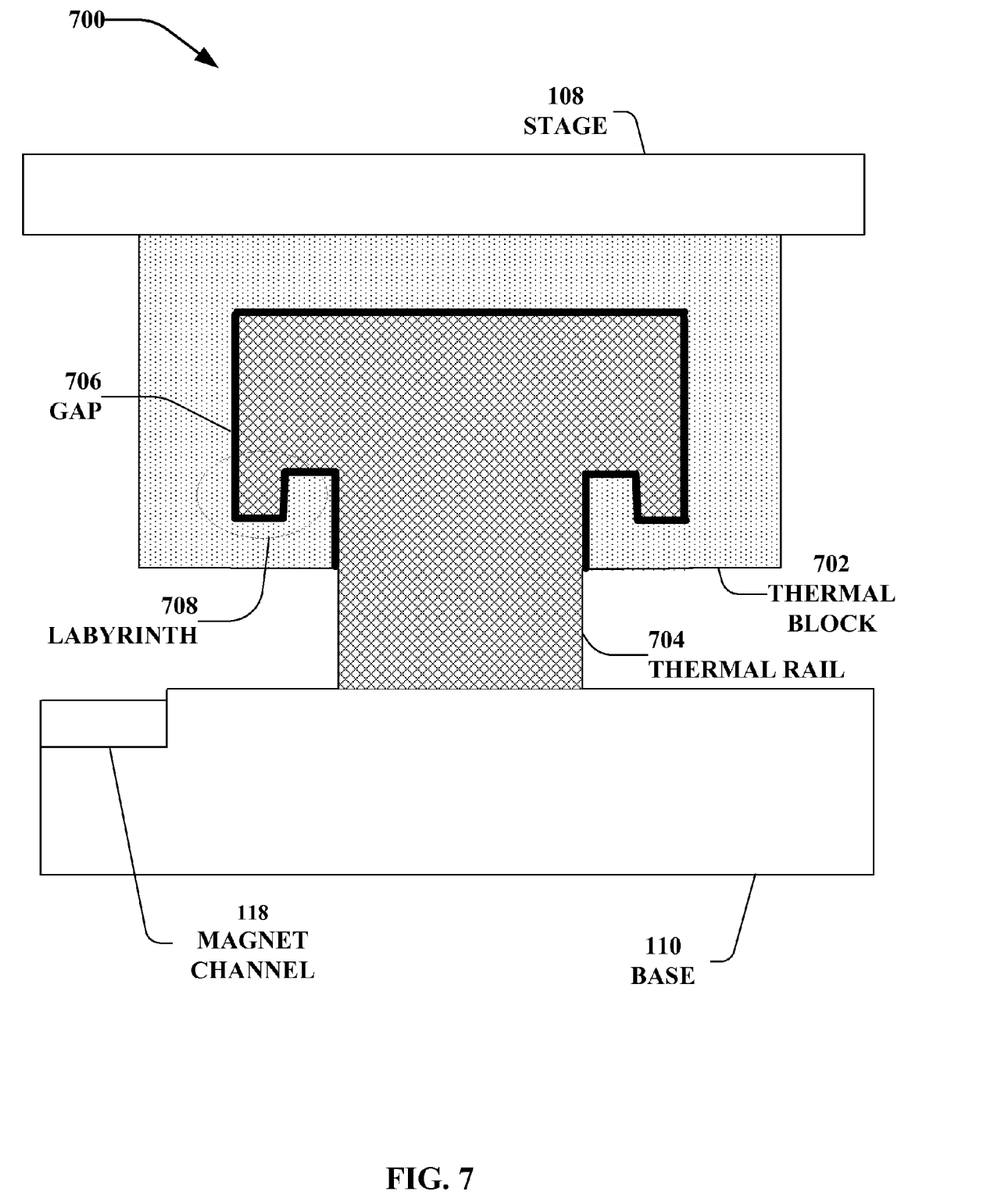
FIG. 7 is a cross-section end perspective view of an example thermal block and thermal rail with a labyrinth in accordance with various aspects set forth herein.

Moving on to FIG. 7, an enlarged cross-sectional perspective view the thermal block 702 conductively coupled to thermal rail 704 is shown in accordance with an example system 700. In particular, FIG. 7 shows that thermal block 702 mounted to the underside of stage 108 coupled to thermal rail 704, which is mounted to base 110 in proximity to the heat source of the system (e.g. as is indicated by the proximity to the magnet channel 118, which corresponds to motor coil 106, not shown, that generates heat in the system). Thermal block 702 and thermal rail 704 are coupled in a manner so as to form gap 706 between a surface of the thermal block 702 and the corresponding surface of the thermal rail 704. Gap 706 is filled with any form of lubricant capable of creating a conductive contact between the respective surfaces of thermal block 702 and thermal rail 704. The shapes of thermal block 702 and thermal rail 704 are formed in such a complimentary manner to form gap 706 that includes labyrinth 708. FIG. 7 has indicated that the labyrinth 708 is in a "U"-shape relative to the base 110 of the system 700 to prevent migration due to gravity of the lubricant filling the gap 706. However, it is to be appreciated that the labyrinth 708 can be any shape so long as it prevents lubricant forming the conductive coupling between the thermal block 702 and thermal rail 704 from escaping or migrating away from gap 706 regardless of the gravitational force or any other influences, such as the increase in thermal energy modifying the viscous properties of the lubricant, etc.

It is to be appreciated that such labyrinthing as shown in system 700 can be employed in any combination of thermal block 102 and thermal rail 104 couplings, thermal block 302 and bearing rail 114 couplings, or bearing block 112 and bearing rail 114 couplings, so as to prevent migration of lubricant from any gap 706 present in the couplings.

Figure 8:
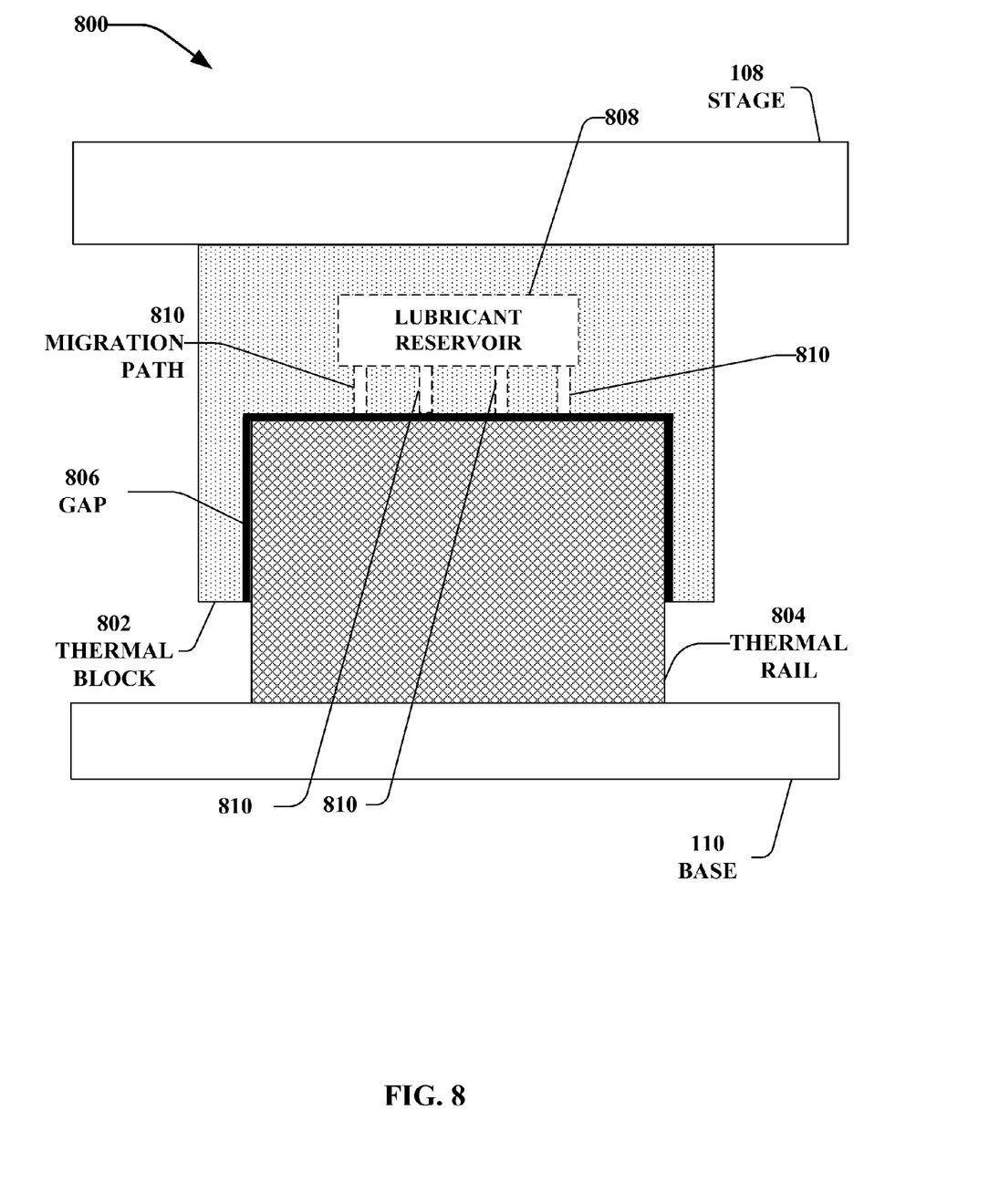
FIG. 8 is a cross-section end perspective view of an example thermal block and thermal rail with a lubricant reservoir in accordance with various aspects set forth herein.

Turning to FIG. 8, a cross-section end perspective view of an example system 800 is shown employing thermal block 802 and thermal rail 804. Thermal block 802 as shown in FIG. 8 is an example of thermal block 102 of FIG. 1 that additionally includes lubricant reservoir 808 located within the thermal block 802 structure. Also, thermal rail 804 is an example of thermal rail 104 of FIG. 1, and gap 806 is an example of gap 506 of FIG. 5. Thermal block 802 of system 800 is mounted to stage 108 and is conductively coupled to thermal rail 804, wherein the thermal rail 804 is mounted to the base 110 and allows for the translation or movement of the stage 108 in relation to the base along the length or the axis of the thermal rail 804. The conductive coupling of system 800 includes a conductive medium, such as a thermally conductive lubricant, that fills gap 806 to create a conductive bridge between a surface of the thermal block 802 and thermal rail 804 to facilitate transferring heat through conduction from a source of heat within system 800 through the thermal block 802 and thermal rail 804 coupling. Depending upon the conductive medium employed, e.g. a lubricant such as lubricating grease or lubricating oil that facilitates thermal conduction, the conductive medium can migrate away from the conductive coupling in gap 806 due to gravity or change in physical properties such as viscosity impacted by the duty cycle of the system 800.

To extend the length of operation of system 800 between maintenance cycles, system 800 includes the lubricant reservoir 808 that retains a quantity of lubricant and disperses or distributes this lubricant to gap 806 through a migration path 810. The migration path 810 provides a conduit between the lubricant reservoir 808 and gap 806 for the lubricant to replenish the layer of lubricant filling gap 806 when the lubricant seeps or leaks away from the conductive coupling in the gap 806. The lubricant, e.g. oil or grease, is dispersed or distributed from the lubricant reservoir 808 through the migration path 810 through capillary action or any other suitable form of fluid dynamics that draws the lubricant from the lubricant reservoir 808 to gap 806 as the lubricant seeps away from the conductive coupling in gap 806.

Moreover, one of ordinary skill in the art would appreciate that such lubricant reservoir is not limited to being located within thermal block 802. The lubricant reservoir can be similarly located in any of thermal rail 804, thermal block 302, bearing block 112, bearing rail 114, etc. to facilitate maintaining a thermally conductive layer of lubrication in a conductive coupling or gap 806, or further to facilitate maintaining lubrication within any load bearing structure 116, e.g. load bearing block 112 and load bearing rail 114 coupling.

Figure 9:
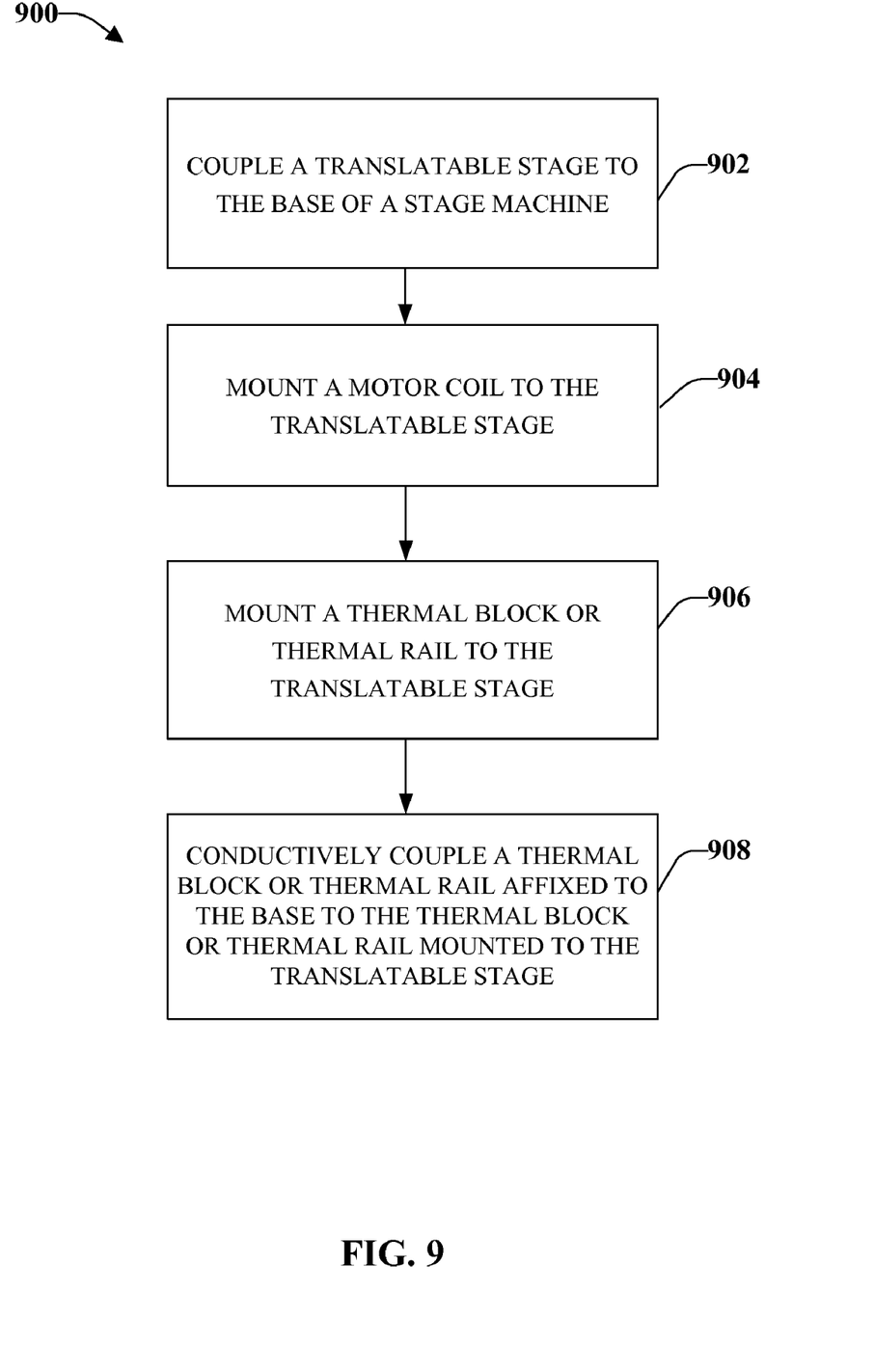
FIG. 9 illustrates an exemplary methodology for constructing a stage machine that facilitates heat removal for use in staging applications in an industrial environment.
Figure 10:
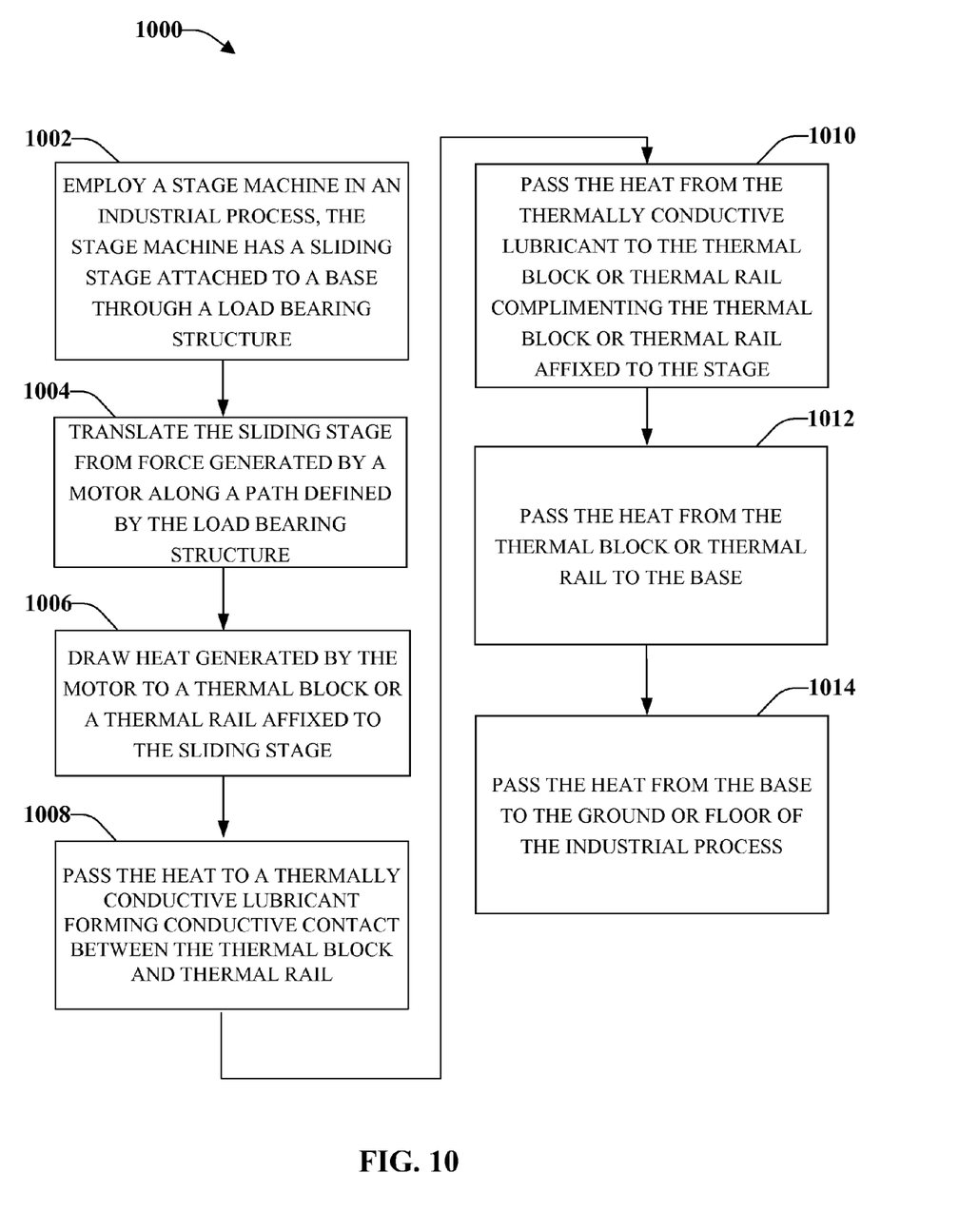
FIG. 10 illustrates an exemplary methodology for implementing a stage machine for use in staging applications in an industrial environment that facilitates removing heat from precision components of the machine.

Referring to FIGS. 9-10, methodologies in accordance with various aspects of the claimed subject matter are illustrated. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter.

FIG. 9 illustrates methodology 900 of constructing a stage machine that facilitates heat removal for use in precision staging applications in an industrial environment. The industrial environment can include a clean and/or vacuum operated environment that is confined in physical space and/or to the introduction of foreign materials or devices capable of removing heat. The stage machine can include any number of stages and can comprise any form of stage machine, including but not limited to a stacked multi-axes stage machine, a tilt stage machine, a gantry or gantry-type machine, a rotational axis machine, or a Cartesian robot. At 902, a translatable stage is coupled to a base of the stage machine so as to allow for the translatable stage to move along a path defined by the coupling. The coupling includes a load bearing structure of load bearing rails affixed to one of the stage or the base and complimentary load bearing blocks that translate or move along the axis of the load bearing rail.

A coil of a motor, wherein the motor includes but is not limited to a linear direct drive motor, a rotary direct drive motor, a ball-screw drive motor, a belt drive motor, and/or a rack-and-pinion motor, is mounted to the stage of the stage machine wherein the motor coil is immovably affixed to the stage at reference numeral 904. The motor generates a force that can translate or move the translatable stage along a path defined by the load bearing structure. Heat or thermal energy generated by the motor, such as passing a current through the motor coil to generate the force to act on the stage, can pass or transfer to the translatable stage that the motor coil is immovably affixed thereto.

The construction of the stage machine of methodology 900 includes mounting a thermal rail or a thermal block to the translatable stage, wherein the thermal block or thermal rail has thermally conductive properties and the mounting is proximate or near to the source of the heat or the area of the stage that accumulates the heat generated by the source as is shown in act 906. The thermal block and/or thermal rail each comprise a material with high thermal conductivity to facilitate and/or enhance drawing heat away from the motor coil on the stage or the area proximate to the motor coil on the stage. Such materials that comprise a thermal block and/or a thermal rail with high thermal conductivity are metals and/or composite materials, and include but are not limited to: aluminum, copper, beryllium-copper, gold, silver, titanium, zinc, magnesium, carbon steel, copper-zinc, or any alloys thereof. Moreover, the thermal block and thermal rail each comprise a material with higher thermal conductivity or lower thermal resistance than the materials comprising the load bearing structure, wherein the bearing block and bearing rail of the load bearing structure can typically comprise steel or any alloy thereof.

In 908, the thermal rail or thermal block mounted to the translatable stage is conductively coupled to a corresponding thermal block or thermal rail mounted to a base of the stage machine. The conductive coupling includes creating conductive contact between the corresponding thermal block and thermal rail coupling through a conductive medium such as a lubricating oil or lubricating grease. The corresponding thermal block and thermal rail combination draw heat away from the source of the heat on the stage machine or an area of the translatable stage that accumulates the heat and conducts this heat through the coupling to the base of the stage machine. The base of the stage machine acts as a heat sink or transfers the heat to the ground or floor of the industrial environment that acts as a larger heat sink than the base of the stage machine.

It must be appreciated that additional thermal blocks can be implemented in the system 900 to draw heat away from the source of the heat and/or translatable stage by providing a conductive contact between the any possible path for heat to travel to the base of the stage machine. To this end, thermal blocks can be implemented within the load bearing structure. For example, a thermal block can be conductively coupled to a load bearing rail within the load bearing structure through a layer of thermally conductive lubricant (e.g. oil or grease) to provide a path from the translatable stage to the base of the stage machine that facilitates drawing heat away from the heat accumulation or source.

FIG. 10 illustrates methodology 1000 implementing a stage machine for use in a precision staging applications in an industrial environment that facilitates removing heat from precision components of the machine. At reference numeral 1002, a stage machine can be employed within a precision staging application in an industrial or manufacturing process. Such precision staging application includes both the precision manufacture and measuring of products and can require use of a stage machine in precision environments such clean rooms, vacuums, limited space rooms, or any combination thereof. The precision stage machine can be an implementation of any number of stages along multiple axes such as in a stacked multi-axes stage machine, a tilt stage machine, a gantry or gantry-type machine, a rotational axis machine, or a Cartesian robot.

At reference numeral 1004, a sliding stage of the stage machine translates along a path defined by a load bearing structure that includes load bearing blocks coupling the stage to a base of the stage machine through load bearing rails that compliment the load bearing blocks. The sliding stage translates in response to a force created by a motor. The motor can include a linear direct drive motor that has a motor coil rigidly affixed or mounted to the translatable stage. An electric current passed through the motor coil interacts with a magnetic field supplied by a magnet channel located in the base thus creating a linear electromagnetic force along the length of the motor coil and magnet channel. The linear force created by the motor coil and magnet channel is applied to the stage as a result of the motor coil being affixed to the stage, thus allowing the motor to force or drive movement of the stage. The motor driving the stage is not limited to a linear direct drive motor. One of ordinary skill in the art would appreciate that any suitable form of motor, in addition to a linear direct drive motor includes but is not limited to a rotary direct drive motor, a ball-screw drive motor, a belt drive motor, and/or a rack-and-pinion motor can be implemented with the present methodology.

Moving on to reference numeral 1006, heat generated by the motor and retained by the sliding stage is drawn to a thermal block or a thermal rail affixed to the sliding stage. Heat or thermal energy is generated as result of the current applied to the motor coil. Increases in the amount or length of duty cycles correspond with an increased amount of heat generated by the motor coil. As a result of the motor coil being affixed to the sliding stage, the heat or thermal energy generated by the motor coil transfers to the stage. Heat transfer or heat exchange in general occurs across heat gradients or between objects with a temperature difference. Furthermore, heat will transfer or dissipate through a material with a higher thermal conductivity or lower thermal resistance faster than a material with a measure of lower thermal conductivity or higher thermal resistance.

Therefore, the increase in temperature of sliding stage from thermal energy that builds up or accumulates in the system from the use of the motor with the sliding stage will seek to dissipate across an object of a lower temperature with high thermal conductivity or a low thermal resistance. Therefore, a block and rail with higher thermally conductive properties than the stage are implemented in the system to facilitate transferring heat away from the source of the heat, e.g. the motor coil on the stage, and away from the stage to protect any precision instrumentation on the stage machine. The block or the rail with high thermally conductive properties, are the thermal block and thermal rail. Materials that form a thermal block and/or a thermal rail with high thermal conductivity are metals or composite materials, and include but are not limited to: aluminum, copper, beryllium-copper, gold, silver, titanium, zinc, magnesium, carbon steel, copper-zinc, or any alloys thereof. Moreover, the thermal block and thermal rail each comprise a material with higher thermal conductivity or lower thermal resistance than the materials comprising the load bearing structure, wherein the bearing block and bearing rail of the load bearing structure can typically comprise steel or any alloy thereof. One of the thermal block or thermal rail is affixed to the sliding stage, and the other of the thermal block or thermal rail that compliments the thermal block or thermal rail affixed to the sliding stage is affixed to the base.

To this end, at reference numeral 1008, heat drawn from the sliding stage through the thermal block or the thermal rail affixed to the sliding stage is passed to a flexible or tensile lubricant that provides a thermally conductive contact or bridge between a surface of the thermal block and a surface of the thermal rail. The lubricant comprises a grease or oil with high thermal conductivity and/or low thermal resistance properties. At 1010, the heat that passes through the thermally conductive lubricant is then conducted to the thermal block or the thermal rail complimenting the thermal block or rail affixed to the sliding stage, the complimentary thermal block or thermal rail is in contact with the thermally conductive lubricant and is affixed to the base of the stage machine. The heat passed to complimentary thermal block or thermal rail affixed to the base conductively transfers to the base of the stage machine at reference numeral 1012. Lastly, the heat passed to the base of the stage machine is passed or transferred from the base to the ground or floor of the industrial environment of the industrial process employing the stage machine, wherein the ground or floor acts as a heat sink at reference numeral 1014.

Moreover, as one or ordinary skill in the art would appreciate, a thermal block that can be in conductive contact to the bearing rail in accordance with system 1000. The thermal block provides a path to dissipate heat from the stage machine in an industrial environment by facilitating the conduction of heat between the heat source on the sliding stage to the base through the bearing rail in addition to the independent thermal block and thermal rail or instead of or in addition to, the independent thermal block and thermal rail. The thermal block can be mounted to the stage or the base so long as the thermal block is in conductive contact with the bearing rail through the thermally conductive grease. The conductive contact of the thermal block to bearing rail also allows for the stage to slide or translate along axis of the bearing rail while maintaining a path for heat to dissipate through conduction.

What has been described above includes examples of the innovation. It is, of course, not possible to describe every conceivable combination of aspects or methodologies for purposes of describing the subject innovation, but one of ordinary skill in the art may recognize that many further combinations and permutations of the innovation are possible. Accordingly, the innovation is intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that facilitates removing heat from a stage machine, comprising:
    a motor coil of a motor rigidly mounted to a stage of the stage machine, the stage is moveable in response to a force generated by the motor;
    the stage mounted to a base of the stage machine through a load bearing structure, the load bearing structure includes a bearing block coupled to a bearing rail; and
    a thermal block conductively coupled to a thermal rail that dissipates heat generated by the motor coil from the stage to the base, wherein the thermal block is at least one of:
        rigidly mounted to the stage and the thermal rail is rigidly mounted to the base; or
        rigidly mounted to the base and the thermal rail is rigidly mounted to the stage.

2. The system of claim 1, the conductively coupled thermal block and thermal rail are mounted adjacent to the motor coil of the stage machine relative to the load bearing structure.

3. The system of claim 1, further comprising an additional thermal block conductively coupled to the bearing rail, the conductively coupled additional thermal block and the bearing rail dissipate heat from the stage to the base.

4. The system of claim 1, the thermal block or the thermal rail each comprise a material with higher thermal conductivity than the bearing block or the bearing rail, wherein the material includes aluminum, copper, beryllium-copper, gold, silver, titanium, zinc, magnesium, carbon steel, copper-zinc, or alloys thereof.

5. The system of claim 1, the stage machine includes at least one of: a single stage machine, a stacked multi-axes stage machine, a tilt stage machine, a gantry machine, a rotational axis machine, or a Cartesian robot.

6. The system of claim 1, the motor includes at least one of: a linear direct drive motor, a rotary drive motor, a ball-screw drive motor, a belt drive motor, or a rack-and-pinion motor.

7. The system of claim 1, the stage machine is employed in at least one of a vacuum or a clean room.

8. The system of claim 1, further comprising a layer of thermally conductive lubricant abutting both a surface of the thermal block and a surface of the thermal rail so as to facilitate heat conduction between the conductively coupled thermal block and thermal rail.

9. The system of claim 8, the thermally conductive lubricant is an oil or a grease employed within the load bearing structure.

10. The system of claim 8, the thermally conductive lubricant is distributed from a reservoir in the thermal block through capillary action to form the layer of thermally conductive lubricant.

11. The system of claim 8, the thermal rail is rigidly mounted to the stage and the thermal block corresponding to the thermal rail is rigidly mounted to the base to prevent thermally conductive lubricant seepage.

12. The system of claim 8, further comprising:
the thermal block is rigidly mounted to the stage and retains a labyrinth so as to prevent migration of the thermally conductive lubricant; and
the thermal rail retains a complimentary shape to the labyrinth.

13. An apparatus for drawing heat from a stage machine, comprising:
a motor coil of a motor fastened to a stage of the stage machine, the stage travels relative to a base of the stage machine in response to a force generated by the motor through a load bearing block paired with a load bearing rail, wherein the load bearing block paired with the load bearing rail attach the stage to the base; and
a thermal block paired with the load bearing rail, the thermal block and load bearing rail pairing conducts heat generated by the motor coil away from the stage to the base.

14. The apparatus of claim 13, the thermal block and load bearing rail pairing further comprising a grease or oil lubricant layer that forms a thermally conductive bridge between a surface of the thermal block and a surface of the load bearing rail.

15. The apparatus of claim 14, the thermal block and the load bearing block are contiguously mounted to the stage and facilitate travel along an axis of the load bearing rail.

16. The apparatus of claim 14, the stage machine is operated in a precision positioning or metrology environment confined by at least one of: a vacuum, a clean room, or physical space.

17. The apparatus of claim 13, further comprising an additional thermal block paired with a thermal rail and includes a grease or oil lubricant layer that forms a thermally conductive bridge between a surface of the thermal block and a surface of the thermal rail, the thermal block and thermal rail pairing positioned proximate to the motor coil with respect to the load bearing rail.

18. The apparatus of claim 17, the thermal block and thermal rail pairing are fastened in at least one of: a same, an inverted, or a perpendicular orientation relative to the load bearing rail and load bearing block pairing.

19. The apparatus of claim 17, a material comprising the thermal block or the thermal rail is a different material than a material of the load bearing block or the load bearing rail, the material of the thermal block or the thermal rail includes metals or composite materials with higher thermal conductive properties than the material comprising the load bearing block or the load bearing rail.

20. A system for transferring heat from a precision stage machine in a confined environment, comprising:
a motor that forces a translatable stage relative to a base of the precision stage machine operating in the confined environment, wherein the confined environment includes at least one of a clean room or a vacuum chamber, and wherein a motor coil of the motor is immovably mounted to the translatable stage;
the translatable stage is connected to a base of the precision stage machine by a bearing block and a bearing rail; and
a thermal block conductively coupled to at least one of the bearing rail or a thermal rail, the conductive coupling includes a gap filled with a thermally conductive medium that creates a conductive bond between respective surfaces of the thermal block and the at least one of the bearing rail or the thermal rail, wherein the thermal block coupling transfers heat generated by the motor coil through the base of the machine to a floor or ground acting as a heat sink for the confined environment.

* * * * *